E. Y. WHITE.
CYCLE FRAME.
APPLICATION FILED AUG. 8, 1913.
1,120,111.
Patented Dec. 8, 1914.
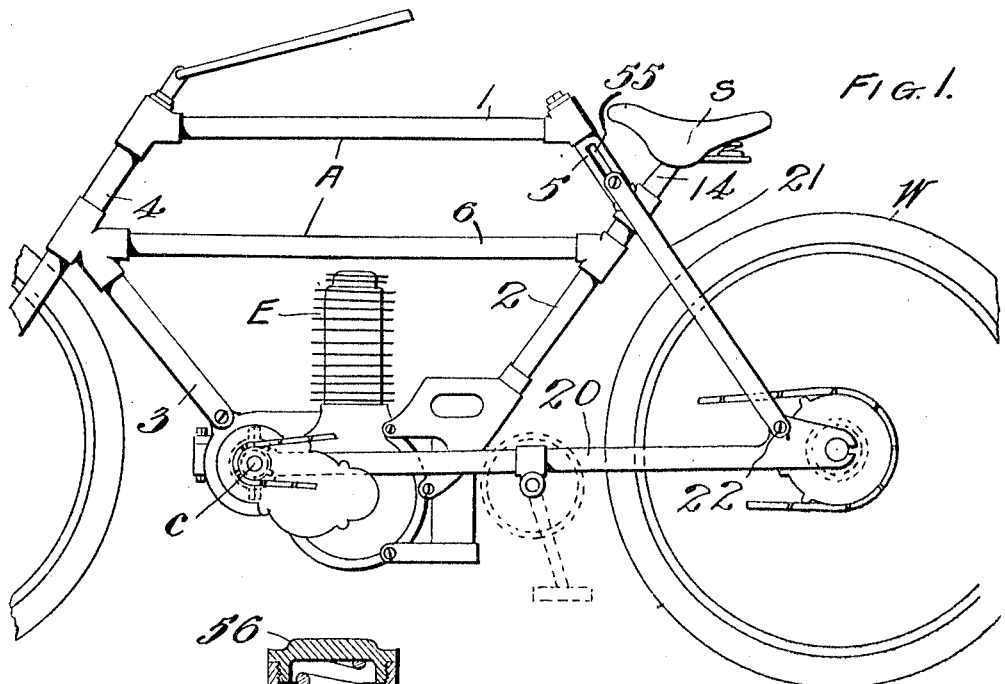
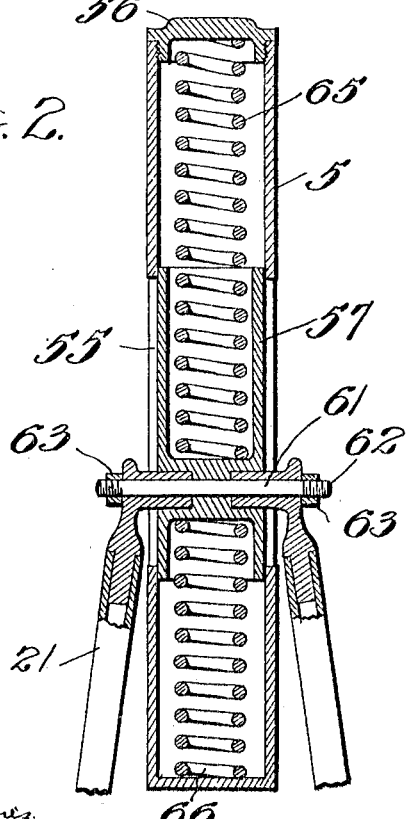
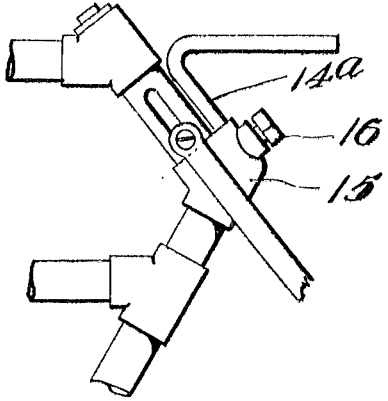

UNITED STATES PATENT OFFICE.

EDWARD YOUNG WHITE, OF SAN ANTONIO, TEXAS.

CYCLE-FRAME.

1,120,111. Specification of Letters Patent. Patented Dec. 8, 1914.

Original application filed July 1, 1908, Serial No. 441,358. Divided and this application filed August 8, 1913. Serial No. 783,731.

*To all whom it may concern:*

Be it known that I, EDWARD Y. WHITE, a citizen of the United States, residing at San Antonio, Texas, have invented certain new and useful Improvements in Cycle-Frames, of which the following is a specification.

This invention has been designed with especial reference to use in motor bicycles, but the frame construction here disclosed may be used advantageously in velocipedes or ordinary bicycles.

The object of the invention is to effectively cushion the rear end of the vehicle against road shocks, and to cushion the rebound, and to accomplish this by a simple and mechanical structure which will give proper lateral bracing.

The present application is a division of my pending application Serial Number 441,358, for motor vehicles.

One exemplifying embodiment of the invention is shown in the accompanying drawing, but it must be understood that the invention is capable of embodiment in many different forms.

Figure 1 is a left side elevation of a vehicle embodying my invention, the particular form of vehicle chosen being a motor-bicycle. Fig. 2 is a longitudinal section through the spring tube or head and upper ends of the rear fork members. Fig. 3 is an enlarged side elevation of a modified form of seat mounting.

The rigid main frame A comprises an upper tube 1, rear tube or seat-mast 2, front tube 3, center tube 6, usually parallel to the upper tube 1, steering head 4, and rear head or spring tube 5, inclined rearwardly, as shown, and connecting upper tube 1, and rear tube 2. The rigid frame A carries engine E, and also mounted on the rigid frame, either as a part of the engine base or otherwise, is a driving center $c$, from which power is transmitted to the rear wheel by sprocket and chain, or other suitable driving means.

The saddle is conveniently carried by a saddle post 14, and this is in turn carried at the top of seat-mast 2. Fig. 3 shows an alternative manner of mounting the saddle, consisting of a fitting 15 in which the seat post 14ª is secured by means of a set screw 16.

The rear or wheel frame carrying the driving wheel W comprises rear braces 20, one on each side of the wheel, and fork members 21, one on each side of the wheel. The braces are pivoted to the rigid frame, and this pivot location may advantageously be about the driving axis $c$. The braces and fork members are pivotally connected at 22 and the upper ends of the fork members are connected to a spring controlled slider or piston 57 within the rear head or spring tube 5. One exemplifying form of such connection is as follows: The tube 5 is provided in each side with a slot 55 and the fork members 21 are connected to the slider through these slots. A suitable specific form of connection may consist, as shown, of studs or trunnions 61 carried by the fork members and entering suitable sockets in the slider, a bolt 62 and nut 63 to pivotally hold the fork ends in connection with the slider. Preferably, the slider has a tubular form, and between it and the bottom of tube 5 is carried recoil spring 66, and between the slider and the top of the tube is carried the main cushion spring 65. Preferably, the top of the tube is closed by removable cap or nut 56, against which the upper end of spring 65 rests. One of the principal features of this spring frame construction is the provision of an inclined rear spring tube or head having in it a spring controlled slide or plunger with which the rear fork members are pivotally connected, and, further, the provision of a main spring above the slider and a recoil spring below the slider to cushion the rebound.

A further important feature consists in a symmetrical, strongly braced, rigid frame, comprising front and rear heads upwardly inclined toward each other, connecting the upper and middle tubes 1 and 6, together with the front and rear tubes 2 and 3 converging downwardly and securely supporting the motor or other appurtenances of a cycle approximately centrally in the rigid frame.

I claim:

1. In a motorcycle, a main frame including a front head and a rear head, a wheel frame including braces pivoted to the main frame and a fork pivoted to the braces, a sliding member within the rear head, a supporting spring intermediate the sliding member and the frame, and a pivotal connection between the fork and the sliding member.

2. In a motorcycle, a main frame including a front head and a rear head, a wheel frame including braces pivoted to the main frame and a fork pivoted to the braces, a sliding member within the rear head, a supporting spring intermediate the sliding member and the frame, a reaction spring intermediate the sliding member and the frame, and a pivotal connection between the fork and the sliding member.

3. In a cycle-frame comprising inclined rear-stays, a seat mast and a horizontal upper frame-member, an inclined tubular member connecting the seat-mast and the horizontal upper frame member, and provided with lateral slots, said inclined member extending in a line substantially parallel with the rear-stays, spring-mechanism inclosed within said inclined member and connected with the upper ends of the rear-stays through said slots, and a removable closure for one end of said inclined member.

4. In a cycle-frame comprising inclined rear-stays, a seat mast and a horizontal upper frame-member, an inclined frame-member connecting the seat mast and the horizontal upper frame-member, and provided with a spring-receiving chamber extending above the horizontal upper frame-member, a removable closure for the forward end of the spring-receiving chamber, a spring in said chamber, and connections between the spring and the upper ends of the rear-stays, the inclined frame member being slotted for the passage of said connections.

5. In a cycle-frame comprising inclined rear-stays, a seat-mast and a horizontal upper frame-member, an inclined tubular member connecting the seat-mast and the horizontal upper frame member, said inclined member extending in a line substantially parallel with the rear stays, spring-mechanism inclosed within said inclined member and connected with the upper ends of the rear-stays, and a removable inclosure for one end of said inclined member.

EDWARD YOUNG WHITE.

Witnesses:
G. W. BRENNER,
E. E. McADOO.

Copies of this patent may be obtained for five cents each, by addressing the "Commissioner of Patents, Washington, D. C."